United States Patent
Hartmann et al.

(10) Patent No.: US 11,299,091 B2
(45) Date of Patent: Apr. 12, 2022

(54) VEHICLE HEADLIGHT AND METHOD FOR ASSISTING A PARKING MANEUVER

(71) Applicant: ZKW GROUP GMBH, Wieselburg (AT)

(72) Inventors: Peter Hartmann, Schonbuhel an der Donau (AT); Markus Reinprecht, Pielachhauser (AT); Josef Pürstinger, Bad Hall (AT); Bettina Reisinger, Amstetten (AT); Clemens Hauer, Steinakirchen am Forst (AT); Matthias Mayer, Mank (AT); Christian Kalousek, Neustift-Innermanzing (AT); Martin Lahmer, Munichreith (AT)

(73) Assignee: ZKW GROUP GMBH, Wieselburg (AT)

( * ) Notice: Subject to any disclaimer, the term of this patent is extended or adjusted under 35 U.S.C. 154(b) by 298 days.

(21) Appl. No.: 16/604,632

(22) PCT Filed: Apr. 11, 2018

(86) PCT No.: PCT/AT2018/000018
§ 371 (c)(1),
(2) Date: Oct. 11, 2019

(87) PCT Pub. No.: WO2018/187823
PCT Pub. Date: Oct. 18, 2018

(65) Prior Publication Data
US 2020/0172005 A1 Jun. 4, 2020

(30) Foreign Application Priority Data
Apr. 11, 2017 (AT) .............................. A 50298/2017

(51) Int. Cl.
*B60Q 1/48* (2006.01)
*F21S 41/141* (2018.01)
(Continued)

(52) U.S. Cl.
CPC ............... *B60Q 1/484* (2013.01); *B60Q 1/24* (2013.01); *B60Q 1/488* (2013.01); *F21S 41/141* (2018.01); *G08G 1/168* (2013.01); *B60Q 2400/50* (2013.01)

(58) Field of Classification Search
CPC .......... B60Q 1/484; B60Q 1/488; B60Q 1/48; B60Q 1/24; B60Q 2400/50; G08G 1/168
(Continued)

(56) References Cited

U.S. PATENT DOCUMENTS 7,843,362 B2 11/2010 Augst
8,655,551 B2 2/2014 Danz et al.
(Continued)

FOREIGN PATENT DOCUMENTS

DE 102006056966 6/2008
DE 102011119923 5/2013
(Continued)

OTHER PUBLICATIONS

Search Report for Austrian Application No. A 50298/2017, dated Nov. 4, 2017 (1 page).
(Continued)

*Primary Examiner* — Laura K Tso
(74) *Attorney, Agent, or Firm* — Eversheds Sutherland (US) LLP

(57) ABSTRACT

The invention relates to a vehicle headlamp (1) comprising; a high-resolution lighting apparatus (2) for projecting various light distributions onto a roadway area (4) positioned in front of a vehicle (3); an environmental detection device (5) for detecting at least one parking space (6) located in the environment surrounding the vehicle (3); and a control device (7) for dynamically controlling the lighting apparatus (2); wherein the environmental detection device (5) is designed to issue information corresponding to a detected
(Continued)

Figure 1:
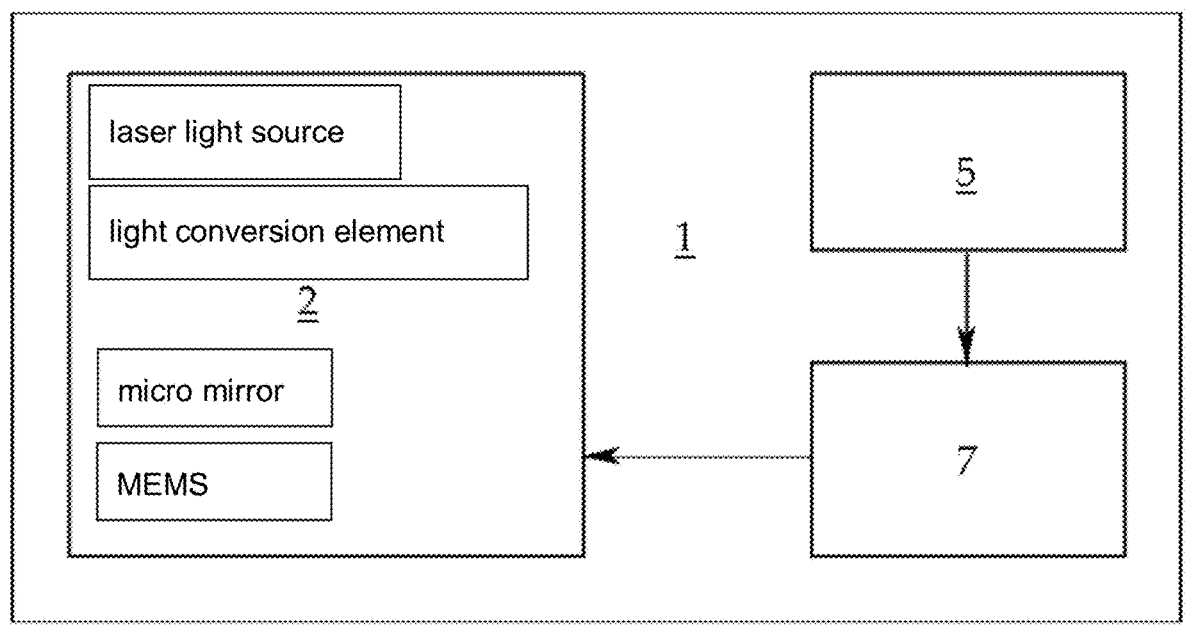

parking space (6) to the control device (7), wherein the control device (7) is designed, in case the environmental detection device (5) detects a parking space (6), to control the lighting apparatus (2), under consideration of at least the information issued by the environmental detection device (5) related to the parking space (6), in such a manner that the lighting apparatus (2) at least projects a definable ground projection (8), which at least represents the vehicle length, onto the roadway area (4) in front of the vehicle (3).

18 Claims, 3 Drawing Sheets

(51) Int. Cl.
*B60Q 1/24* (2006.01)
*G08G 1/16* (2006.01)
(58) Field of Classification Search
USPC .......................................................... 362/538
See application file for complete search history.

(56) References Cited

U.S. PATENT DOCUMENTS

| | | |
|---|---|---|
| 2010/0283634 A1 | 11/2010 | Krautter et al. |
| 2013/0046441 A1 | 2/2013 | Marczok et al. |
| 2015/0203023 A1 | 7/2015 | Marti et al. |
| 2017/0106793 A1 | 4/2017 | Kumar et al. |
| 2018/0004020 A1 | 1/2018 | Kunii et al. |
| 2020/0406814 A1 * | 12/2020 | Cunningham, III ... B60K 35/00 |

FOREIGN PATENT DOCUMENTS

| | | | |
|---|---|---|---|
| DE | 102013215980 | 2/2015 | |
| JP | 2008143505 | 6/2008 | |
| WO | WO-2021037858 A1 * | 3/2021 | ........... B62D 15/027 |
| WO | WO-2021037859 A1 * | 3/2021 | ............ B60Q 1/488 |

OTHER PUBLICATIONS

International Search Report and Written Opinion for PCT/AT2018/000018, dated Feb. 4, 2019 (15 pages).

* cited by examiner

VEHICLE HEADLIGHT AND METHOD FOR ASSISTING A PARKING MANEUVER

The invention relates to a vehicle headlamp. The invention furthermore relates to a method for supporting a parking procedure of a vehicle into a parking spot by means of a ground projection by a vehicle headlamp.

Systems which intervene in or contribute to parking procedures in a supportive manner are known from the state of the art. Typically, systems are used in the automotive industry, which include cameras and/or distance sensors, which are arranged in various areas of a vehicle, in particular on the bumpers or in the area of the radiator grill.

The vehicle operator can be supported in various ways during the parking procedure by such systems. The supportive measures range from audio signals, optical signals on a screen, optical signals on a head-up display, up to automated systems that can take over the parking procedure completely.

Such systems are complex and prone to error in certain circumstances, as the components they use generally are exposed directly to environmental impacts and could, for example, fail due to contamination or could be damaged by mechanical impacts, in particular in case they are arranged in the bumper. The use of audio signals typically is only used to signal distances. While the use of optical signals in the interior of a vehicle makes it possible to display steering information, such displays in the interior of a vehicle also cause the attention of a vehicle operator to be directed toward the display in the interior, thus potentially disregarding the area located outside of the vehicle. This is particularly problematic in situations in which third parties, for example pedestrians or bicyclists, are in motion relative to the vehicle.

Therefore, the problem underlying the invention is to create a system that overcomes the aforementioned disadvantages, is robust and can be used to effectively support the vehicle operator during the execution of a parking manoeuvre, in particular in selecting a suitable parking space.

This problem is solved by a vehicle headlamp, which, according to the invention, comprises:
- a high-resolution lighting apparatus for projecting various light distributions onto a roadway area positioned in front of a vehicle;
- an environmental detection device for detecting at least one parking space located in the environment around the vehicle, wherein the parking space preferably is located in the environment of the roadway area in front of the vehicle at the time of detection; and
- a control device for dynamically controlling the lighting apparatus;

wherein the environmental detection device is designed to issue information corresponding to a detected parking space to the control device, wherein the control device is designed, in case the environmental detection device detects a parking space, to control the lighting apparatus, under consideration of at least the information issued by the environmental detection device related to the parking space, in such a manner that the lighting apparatus at least projects a definable ground projection, which at least represents the vehicle length, onto the roadway area in front of the vehicle. Furthermore, it can be provided that the high-resolution lighting apparatus also is designed to project various light distributions onto other roadway areas in the environment surrounding the vehicle, which are located not only in front of the vehicle, or that an additional high-resolution lighting apparatus is provided for this purpose.

The use of a vehicle headlamp with a high-resolution lighting apparatus for supporting a parking procedure has the particular advantage that the signals supporting the vehicle operator can be projected directly onto the roadway in this arrangement according to the invention, such that the vehicle operator continues to direct his/her full attention to the roadway. Furthermore, the manner in which the environmental detection device and the control device are housed makes for a particularly compact and robust design, which can be integrated into a vehicle simply and without needing to conform the remaining vehicle portions. By projecting at least one ground projection representing at least the vehicle length onto the roadway area located in front of the vehicle, the vehicle operator is able to estimate in advance, based on a comparison of the ground projection with the parking space, whether the parking space is sufficiently large for a parking procedure.

The high-resolution lighting apparatus in principle can be any lighting apparatus known to a person skilled in the art, which is suitable to project various light distributions onto a roadway at a resolution of 1°, preferably at a resolution below 0.5°. The light distributions can for example be low-beam or high-beam light distributions, but also a light distribution corresponding to a ground projection.

Figure 2:
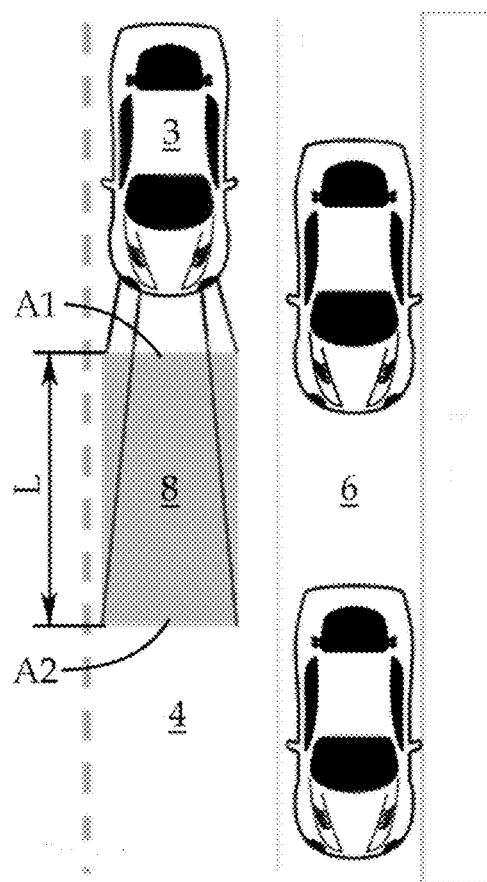
Figure 3:
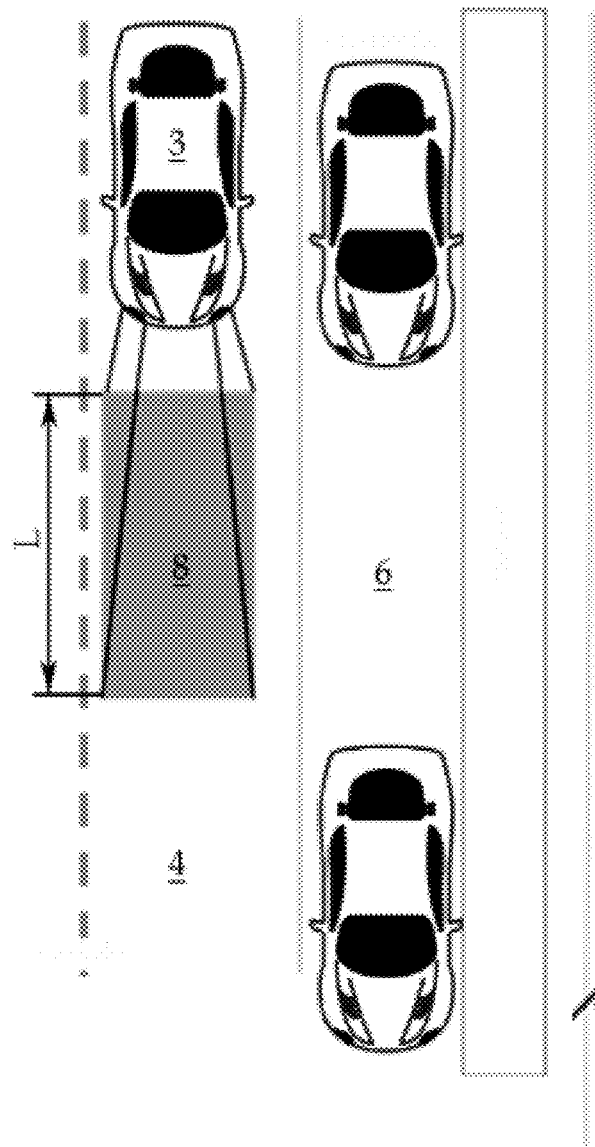
Figure 4:
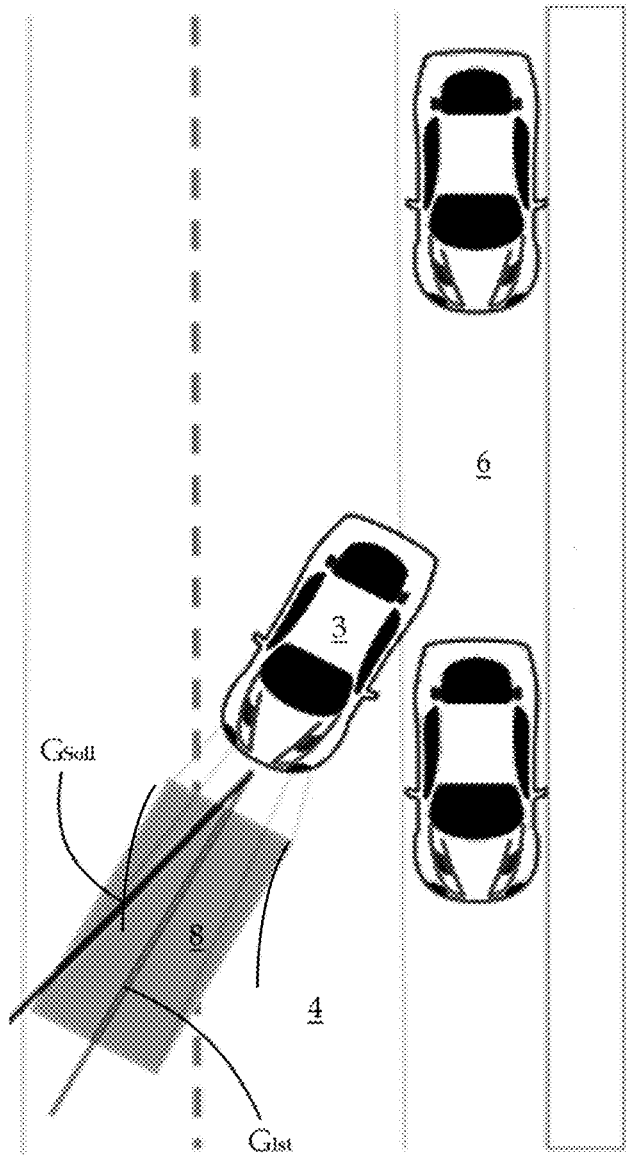

It can be provided in particular that the ground projection representing at least a vehicle length has at least a brightened beginning section and a brightened end section, wherein the distance from an outer end of the beginning section to the outer end of the end section represents the vehicle length. If the brightened beginning section and brightened end sections consist of stripes oriented parallel to each other, for example, as shown in FIGS. 2 to 4, then the distance in question is indicated by the distance between the outer opposite ends of the stripes. The brightening of said sections is achieved by a targeted emission of light by the lighting apparatus, wherein the light emission is selected such that the light intensity in the brightened section is visibly greater from the perspective of the vehicle operator than is that of the surrounding area, in particular that it exceeds the light intensity of the surrounding area by at least 20%, preferably by 50%, or—in case of darkness—even by far greater than 500%.

Furthermore, it can be provided that the area between the beginning section and the end section is brightened in such a manner that the ground projection representing at least the vehicle length has an essentially rectangular shape, wherein the length of the rectangle is equal to between 100% and 150% of that of the vehicle. These dimensions relate to a horizontal roadway and a horizontal vehicle and/or vehicle headlamp orientation.

In particular, it can be provided that the width of the rectangle is equivalent to the width of the vehicle. Thus, the vehicle operator is able to also easily compare the width of the parking space with the width of the vehicle.

It can also be favourable if the control device has an interface, by means of which the distance from an outer end of the beginning section to an outer end of the end section is selectable by the vehicle operator within a range of 100% to 150% of the vehicle length. This way, the vehicle operator can select a projection which is equivalent to a definable (not whole-number) multiple of the original vehicle size and thus select a ground projection which corresponds to his/her preferred minimal parking space size. The selection of the length of the ground projection, that is, the distance of said sections can be conducted in steps (e.g. in 1% to 10% steps) or also continuously.

Preferably, the control device can be set up to control the lighting apparatus in such a manner that the ground projection is projected onto the immediate vicinity of the parking space which in particular is positioned level with the parking space on the roadway next to the parking space. Such an immediate vicinity lies within a distance of no more than 5 m from the parking space, for example.

It also can be favourable if the lighting apparatus is set up to generate at least one low-beam light distribution in addition to the ground projection.

In order to additionally support a parking procedure, it can be provided that the control device is set up to calculate or determine at least one target parking manoeuvre, under consideration of
- the position and orientation of the vehicle in relation to the parking space,
- as well as of a detected position and dimension of the parking space, and to control the lighting apparatus in such a manner that symbols representing steering instructions can be, or are, projected onto the roadway, in dependence on a comparison
- between the position and orientation of the vehicle in relation to the parking space as detected by the environmental detection device
- and the at least one target parking manoeuvre.

For this purpose, corresponding position data and orientation data are delivered to the control device by the environmental detection device. Thus, the vehicle operator can be actively supported during a parking procedure. The symbols representing steering instructions could comprise arrow symbols, for example.

Alternatively or additionally, the symbols can comprise at least two ground projections in the form of straight or curved lines, wherein a first line represents the actual orientation of the vehicle and the second line represents a target orientation of the vehicle in relation to the parking space as derived from the at least one target parking manoeuvre. Therein, the second line can be indicated such that the vehicle operator, by performing steering manoeuvres which bring the lines into congruence or concordance, will find an optimal steering movement for parking, wherein the two lines of course can be modified in dependence on the current position and orientation of the vehicle.

Alternatively, it can be provided that the control device has an interface via which information regarding the current steering movements of the vehicle can be supplied, wherein the symbols comprise at least two ground projections in the form of straight or curved lines, wherein the control device is set up to project the lines in such a manner that a first line represents the actual steering movement of the vehicle and the second line represents a target steering movement of the vehicle in relation to the parking space, as derived from the at least one target parking manoeuvre. Thus, the operator can find and maintain an optimal steering movement particularly quickly.

In particular, it can be provided that the environmental detection device is set up to determine the dimensions of the parking space and compare them with the vehicle dimensions to review the feasibility of parking in said space, wherein the environmental detection device is connected with the control device to supply the result of the comparison, wherein the control device is set up to consider the result of the comparison and to only control the lighting apparatus to project a ground projection representing at least the vehicle length in the case of a positive result of the review. Thus, it can be ensured in a simple manner that ground projections are only conducted for parking spaces which are sufficiently large to accommodate the vehicle. Incidentally, the environmental detection device must not be designed as an integral unit but can also consist of individual components which are connected with each other. Typically, an environmental detection device can contain optical sensors, in particular a camera, ultrasound sensors or any other sensors used to capture the environment that are known to a person skilled in the art, as well as a computer unit for processing and transmitting the detected information.

In general, the environmental detection device does not have to be set up to capture the entire environment surrounding the vehicle. As the device is installed in a vehicle headlamp, this is practically impossible in many cases, as the field of vision of the environmental detection device covers less than 360° in this case. However, the environmental detection device is well set up to detect a parking space located in front of the vehicle.

Advantageously, it can be provided that the control device has an interface for supplying additional environmental data, which were not captured by the environmental detection device, wherein the control device is set up to continuously consider these additional environmental data when determining the ground projection. This makes it possible to consider additional environmental data, which for example are captured by parking sensors, distance sensors, external cameras or other external environmental detection devices when selecting the ground projection, and thereby also consider continuous information regarding obstacles located behind the vehicle when determining the ground projection. Thus, the ground projection, in particular driving directions to the vehicle operator, can be continuously updated under consideration of the information from the external environmental detection device. Additionally or alternatively to this, it also is feasible that the vehicle headlamp, that is, its respective components, are set up to draw conclusions regarding an area located behind a vehicle, in particular a parking space, if the same had already been detected by the environmental detection device, for example while passing by said area. The environmental information relating to the parking space could be archived in a storage device, wherein the movement of the vehicle relative to the parking space is detected by the environmental detection device (acceleration sensors can be used to complement this process), whereby the position of the vehicle relative to the parking space can be determined continuously—which means that the parking space as such does not have to be detected continuously.

It can be particularly favourable if the lighting apparatus comprises LED light sources arranged in a matrix, which are controllable separately, for projecting various distinct light distributions. Such a lighting apparatus is known from the publication AT 513738 A1, for example.

Additionally or alternatively to this, it also can be provided that the lighting apparatus comprises at least one laser light source having a light conversion element for converting the laser light into visible light, which is downstream of the laser light source, for projecting various light distributions, wherein the light emitted by the laser light source is directed toward at least one light-deflecting unit, wherein the light-deflecting unit is set up to deflect the light emitted by the laser light source in such a manner onto the light conversion element in various definable directions that various distinct light distributions can be generated. For this purpose, the light-deflecting unit can, for example, comprise at least one micro mirror which can be swivelled about one or two axes, for example, in form of a MEMS (micro-electro-mechanical system). A variant of such a lighting apparatus is known from AT 513909 A1, for example. A lighting apparatus, in which a laser light system was combined with a matrix-LED lighting system, is known from AT 514 333 A4, for example.

Furthermore, the invention relates to a motor vehicle with a vehicle headlamp according to the invention.

Another aspect of the invention relates to a method for supporting a parking procedure of a vehicle into a parking spot by means of a ground projection by a vehicle headlamp, in particular a vehicle headlamp according to the invention, wherein the vehicle headlamp comprises:

a high-resolution lighting apparatus for projecting various light distributions onto a roadway area positioned in front of a vehicle;

an environmental detection device for detecting at least one parking space located in the environment around the vehicle, wherein the parking space preferably is located in the environment of the roadway area in front of the vehicle at the time of detection; as well as a control device for dynamically controlling the lighting apparatus; wherein the method includes the following steps:

a) Detecting at least one parking space located in the environment of the roadway area in front of the vehicle by means of the environmental detection device;

b) Issuing the information corresponding to the parking space detected by the environmental detection device to the control device;

c) Projecting at least one definable ground projection representing at least the vehicle length onto the roadway area in front of the vehicle by means of the lighting apparatus by sending appropriate control signals from the control device to the lighting apparatus.

Furthermore, it can be provided that the high-resolution lighting apparatus also is designed to project various light distributions onto other roadway areas in the environment surrounding the vehicle, which are located not only in front of the vehicle, or that an additional high-resolution lighting apparatus is provided for this purpose. For example, a high-resolution lighting apparatus can be provided in the rear area of a vehicle, by means of which appropriate ground projections, as described in the context of this document, can be projected onto a roadway area located behind the vehicle.

In the following, the invention is explained in more detail on the basis of an exemplary, non-restrictive embodiment, which is illustrated in the drawings. The drawings show:

FIG. 1 A schematic representation of a vehicle headlamp according to the invention FIG. 2 A first example of a ground projection that can be projected by a vehicle headlamp according to the invention after a parking space has been detected FIG. 3 The ground projection according to FIG. 2 after another parking space has been detected FIG. 4 An example of a parking procedure subsequent to the situation according to FIG. 3

Figure 5:
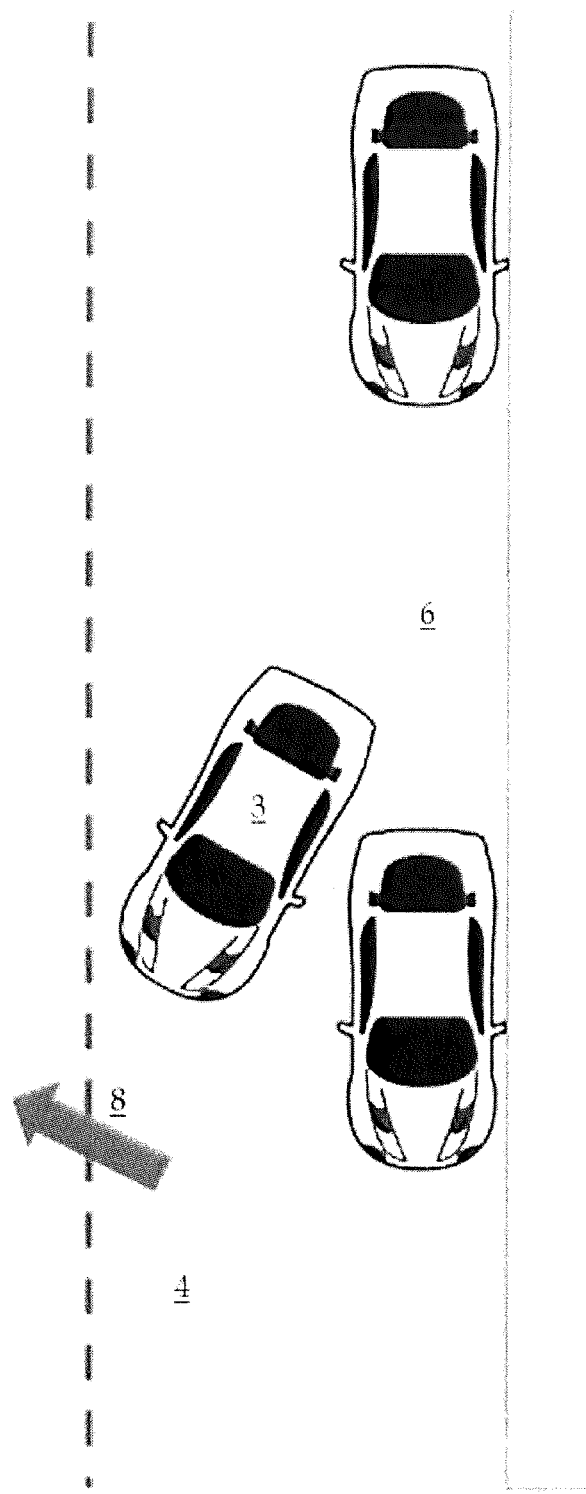

FIG. 5 A second example of a parking procedure subsequent to the situation according to FIG. 3

Unless noted otherwise, identical reference numbers refer to identical characteristics in the following drawings.

FIG. 1 shows a schematic representation of an embodiment of a vehicle headlamp 1 according to the invention. The vehicle headlamp 1 comprises a high-resolution lighting apparatus 2 for projecting various light distributions onto a roadway area 4 located in the environment of a vehicle 3 (see FIGS. 2 and 3), an environmental detection device 5 for detecting at least one parking space 6 located in the environment of the vehicle 3, wherein the parking space 6 preferably is located in the environment of the roadway area 4 located in front of the vehicle 3 at the time it is detected, and a control device 7 for dynamically controlling the lighting apparatus 2. The environmental detection device 5 is set up to issue the information corresponding to a detected parking space 6 to the control device 7. The control device 7 is set up, in case the environmental detection device 5 detects a parking space 6, to control the lighting apparatus 2, under consideration of at least the information issued by the environmental detection device 5 related to the parking space 6, in such a manner that the lighting apparatus 2 at least projects a definable ground projection 8, which at least represents the vehicle length L, onto the roadway area 4 in front of the vehicle 3, as shown by way of example in FIGS. 2 and 3.

FIGS. 2 and 3 show examples of the use of one or two vehicle headlamps 1 according to the invention in a vehicle 3 during a parking situation. In the situation according to FIG. 2, the parking space 6 is smaller than the vehicle operator. This circumstance is signalled to the vehicle operator in a simple manner, as the length L of the ground projection 8 is at least equivalent to the vehicle length. By comparing the ground projection 8 with the parking space 6, the vehicle operator can easily determine whether the parking space 6 is of sufficient size. The ground projection 8 shown in FIGS. 2 and 3 comprises a beginning section A1 and an end section A2, wherein the area between the sections also is illuminated such that the ground projection 8 is designed in the shape of a rectangle. The distance L from the outer end of the beginning section A1 to the outer end of the end section A2 represents the vehicle length.

The length L of the ground projection can be defined according to the wishes of the vehicle operator. It can be selected to be between 100% and 150% of the vehicle length. It can also be provided that the width of the rectangle is equivalent to the width of the vehicle 3, that is, that the vehicle headlamp 1 can be configured to define the corresponding width.

In the situation according to FIG. 3, the parking space is longer than the vehicle length or, respectively, the length L of the corresponding ground projection 8. This is made particularly visible to a vehicle operator as the control device 7 is set up to control the lighting apparatus 2 in such a manner that the ground projection 8 is projected onto the immediate vicinity of the parking space 6 which in particular is positioned level with the parking space 6 on the roadway 4 next to the parking space 6.

FIG. 4 shows an example of a parking procedure subsequent to the situation according to FIG. 3 Preferably, the control device 7 is set up to calculate or determine at least one target parking manoeuvre, under consideration of the position and orientation of the vehicle 3 in relation to the parking space 6, as well as of a detected position and dimension of the parking space 6, and to control the lighting apparatus 2 in such a manner that symbols representing steering instructions can be, or are, projected onto the roadway, in dependence on a comparison between the position and orientation of the vehicle 3 in relation to the parking space 6 as detected by the environmental detection device 5 and the at least one target parking manoeuvre.

FIG. 5 herein shows an example, in which the steering movement to be selected is signalled to the vehicle operator by an arrow symbol. Alternatively or additionally, the ground projections 8 can also comprise two ground projections in the form of straight lines, wherein a first line $G_{Ist}$ represents the actual orientation of the vehicle 3 and the second line $G_{Soll}$ represents a target orientation of the vehicle 3 in relation to the parking space 6 as derived from the at least one target parking manoeuvre. It can be particularly advantageous if the control device 7 has an interface via which information regarding the current steering movements of the vehicle 3 can be supplied, wherein the symbols comprise at least two ground projections in the form of straight or curved lines (the lines in particular can be designed as circular sections, wherein the radius of the circle can be determined in dependence on the steering movement), wherein the control device 7 is set up to project the lines, e.g. $G_{Soll}$ and $G_{Ist}$, in such a manner that a first line represents the actual steering movement of the vehicle 3 and the second line represents a target steering movement of the vehicle 3 in relation to the parking space 6, as derived from the at least one target parking manoeuvre.

The invention furthermore relates to a method for supporting a parking procedure of a vehicle 3 into a parking spot 6 by means of a ground projection 8 by a vehicle headlamp 1 according to the invention, wherein the method includes the following steps:

a) Detecting at least one parking space 6 located in the environment of the roadway area 4 in front of the vehicle 3 by means of the environmental detection device 5;

b) Issuing the information corresponding to the parking space 6 detected by the environmental detection device 5 to the control device 7; and c) Projecting at least one definable ground projection 8 representing at least the vehicle length onto the roadway area 4 in front of the vehicle 3 by means of the lighting apparatus 2 by sending appropriate control signals from the control device 7 to the lighting apparatus 2.

As previously mentioned, the invention makes it possible to support the vehicle operator in an effective manner during the execution of a parking manoeuvre, wherein the vehicle operator is able to continue to direct his/her attention to the roadway. Furthermore, this functionality can be implemented by the vehicle headlamp 1 according to the invention in a particular robust and compact manner. In the examples according to FIGS. 2 to 5, the vehicle 3 comprises two vehicle headlamps 1 according to the invention. In principle, any desired combination of vehicle headlamps is conceivable. Thus, two vehicle headlamps 1 according to the invention could generate the desired ground projections individually or jointly, for example. The vehicle headlamps 1 also could be set up to communicate with each other, and could, for example, exchange respective environmental data they detected, thus determining a joint ground projection by means of at least one of the control devices 7.

Considering this technical teaching, the person skilled in the art is able to achieve other embodiments of the invention, which are not shown here, without further inventive activity. The invention therefore is not restricted to the embodiment shown here. Furthermore, individual aspects of the invention or of the embodiment can be extracted and combined with each other. Essential are the ideas underlying the invention, which can be executed in many ways by a person skilled in the art who has knowledge of this description, but nonetheless continue to be ideas according to this invention.

The invention claimed is:

1. A vehicle headlamp (1), comprising:
a high-resolution lighting apparatus (2) for projecting various light distributions onto a roadway area (4) positioned in front of a vehicle (3), wherein the high-resolution lighting apparatus (2) is suitable to project various light distributions onto a roadway at a resolution of 1° or less;
an environmental detection device (5) for detecting at least one parking space (6) located in the environment surrounding the vehicle (3); and
a control device (7) for dynamically controlling the lighting apparatus (2);
wherein the environmental detection device (5) is set up to issue information corresponding to a detected parking space (6) to the control device (7), wherein the control device (7) is designed, in case the environmental detection device (5) detects a parking space (6), to control the lighting apparatus (2), under consideration of at least the information issued by the environmental detection device (5) related to the parking space (6), in such a manner that the lighting apparatus (2) at least projects a definable ground projection (8), which at least represents the vehicle length, onto the roadway area (4) in front of the vehicle (3), wherein the control device (7) is set up to calculate or determine at least one target parking maneuver, under consideration of
the position and orientation of the vehicle (3) in relation to the parking space,
as well as of a detected position and dimension of the parking space (6), and to control the lighting apparatus (2) in such a manner that symbols representing steering instructions are projected onto the roadway, in dependence on a comparison
between the position and orientation of the vehicle (3) in relation to the parking space (6) as detected by the environmental detection device (5)
and the at least one target parking maneuver,
wherein the lighting apparatus (2) comprises at least one laser light source having a light conversion element for converting the laser light into visible light, which is downstream of the laser light source, for projecting various light distributions, wherein the light emitted by the laser light source is directed toward at least one light-deflecting unit, wherein the light-deflecting unit is set up to deflect the light emitted by the laser light source in such a manner onto the light conversion element in various definable directions that various distinct light distributions can be generated, wherein the light-deflecting unit comprises at least one micro mirror for this purpose, which at least one micro mirror can be swivelled about one or two axes.

2. The vehicle headlamp (1) according to claim 1, wherein the ground projection (8) representing at least a vehicle length has at least a brightened beginning section (A1) and a brightened end section (A2), wherein the distance from an outer end of the beginning section (A1) to the outer end of the end section (A2) represents the vehicle length.

3. The vehicle headlamp (1) according to claim 2, wherein the area between the beginning section (A1) and the end section (A2) is brightened in such a manner that the ground projection (8) representing at least the vehicle length has an essentially rectangular shape, wherein the length of the rectangle is equal to between 100% and 150% of that of the vehicle (3).

4. The vehicle headlamp (1) according to claim 3, wherein the width of the rectangle is equivalent to the width of the vehicle (3).

5. The vehicle headlamp (1) according to claim 2, wherein the control device (7) has an interface, by means of which the distance from an outer end of the beginning section (A1) to an outer end of the end section (A2) is selectable by the vehicle operator within a range of 100% to 150% of the vehicle length.

6. The vehicle headlamp (1) according to claim 1, wherein the control device (7) is set up to control the lighting apparatus (2) in such a manner that the ground projection (8) is projected onto the immediate vicinity of the parking space (6).

7. The vehicle headlamp (1) according to claim 1, wherein the lighting apparatus (2) is set up to generate at least one low-beam light distribution in addition to the ground projection (8).

8. The vehicle headlamp (1) according to claim 1, wherein the symbols comprise arrow symbols.

9. The vehicle headlamp (1) according to claim 7, wherein the symbols additionally comprise at least two ground projections in the form of straight or curved lines, wherein a first line ($G_{ist}$) represents the actual orientation of the vehicle (3) and a second line ($G_{Soll}$) represents a target orientation of the vehicle (3) in relation to the parking space (6) as derived from the at least one target parking maneuver.

10. The vehicle headlamp (1) according to claim 7, wherein the control device (7) has an interface via which information regarding the current steering movements of the vehicle (3) can be supplied, wherein the symbols additionally comprise at least two ground projections in the form of straight or curved lines, wherein the control device (7) is set up to project the lines in such a manner that a first line represents the actual steering movement of the vehicle (3) and a second line represents a target steering movement of the vehicle (3) in relation to the parking space (6), as derived from the at least one target parking maneuver.

11. The vehicle headlamp (1) according to claim 1, wherein the environmental detection device (5) is set up to determine the dimensions of the parking space (6) and compare them with the vehicle dimensions to review the feasibility of parking in said space, wherein the environmental detection device (5) is connected with the control device (7) to supply the result of the comparison, wherein the control device (7) is set up to consider the result of the comparison and to only control the lighting apparatus (2) to project a ground projection (8) representing at least the vehicle length in the case of a positive result of the review.

12. The vehicle headlamp (1) according to claim 1, wherein the control device (7) has an interface for supplying additional environmental data, which were not captured by the environmental detection device (5), wherein the control device (7) is set up to continuously consider these additional environmental data when determining the ground projection (8).

13. A motor vehicle comprising a vehicle headlamp (1) according to claim 1.

14. A method for supporting a parking procedure of a vehicle (3) into a parking space (6) by means of a ground projection (8) by a vehicle headlamp (1) which comprises:

a high-resolution lighting apparatus (2) for projecting various light distributions onto a roadway area (4) positioned in front of the vehicle (3);

an environmental detection device (5) for detecting at least one parking space (6) located in the environment surrounding the vehicle (3); as well as a control device (7) for dynamically controlling the lighting apparatus (2);

wherein the method comprises:

a) detecting at least one parking space (6) located in the environment of the roadway area in front of the vehicle (3) by means of the environmental detection device (5);

b) issuing the information corresponding to the parking space (6) detected by the environmental detection device (5) to the control device (7); and c) projecting at least one definable ground projection (8) representing at least the vehicle length onto the roadway area (4) in front of the vehicle (3) by means of the lighting apparatus (2) by sending appropriate control signals from the control device (7) to the lighting apparatus (2), wherein the control device (7) is set up to calculate or determine at least one target parking maneuver, under consideration of the position and orientation of the vehicle (3) in relation to the parking space, as well as of a detected position and dimension of the parking space (6), and to control the lighting apparatus (2) in such a manner that symbols representing steering instructions are projected onto the roadway, in dependence on a comparison between the position and orientation of the vehicle (3) in relation to the parking space (6) as detected by the environmental detection device (5)

and the at least one target parking maneuver.

15. The vehicle headlamp (1) according to claim 1, wherein the high-resolution lighting apparatus (2) is configured to project light distributions onto a roadway at a resolution of 1°.

16. The vehicle headlamp (1) according to claim 1, wherein the high-resolution lighting apparatus (2) is configured to project light distributions onto a roadway at a resolution less than 0.5°.

17. The vehicle headlamp (1) according to claim 1, wherein the at least one micro mirror is configured to swivel about the one or two axes in a form of a MEMS.

18. The vehicle headlamp (1) according to claim 6, wherein the ground projection (8) is projected next to the parking space (6).

* * * * *